(12) United States Patent
Champaigne et al.

(10) Patent No.: US 10,837,849 B2
(45) Date of Patent: Nov. 17, 2020

(54) ELECTRONIC PEENING INTENSITY SENSOR

(71) Applicant: Electronics, Inc., Mishawaka, IN (US)

(72) Inventors: Jack Champaigne, Mishawaka, IN (US); David Kirk, Kenilworth (GB)

(73) Assignee: Electronics, Inc., Mishawaka, IN (US)

( * ) Notice: Subject to any disclaimer, the term of this patent is extended or adjusted under 35 U.S.C. 154(b) by 15 days.

(21) Appl. No.: 16/407,854

(22) Filed: May 9, 2019

(65) Prior Publication Data

US 2019/0346322 A1  Nov. 14, 2019

Related U.S. Application Data

(60) Provisional application No. 62/669,136, filed on May 9, 2018.

(51) Int. Cl.
*G01L 5/00* (2006.01)
*G01H 13/00* (2006.01)
*G01F 1/30* (2006.01)

(52) U.S. Cl.
CPC .............. *G01L 5/0052* (2013.01); *G01F 1/30* (2013.01); *G01H 13/00* (2013.01)

(58) Field of Classification Search
CPC .......... G01L 5/0052; G01F 1/30; G01H 13/00

USPC ........................................................ 73/11.02
See application file for complete search history.

(56) References Cited

U.S. PATENT DOCUMENTS

| | | | |
|---|---|---|---|
| 4,470,292 A | 9/1984 | DeClark et al. | |
| 5,113,680 A | 5/1992 | Matsuura et al. | |
| 6,412,331 B1 * | 7/2002 | Clauer | B23K 26/03 73/11.02 |
| 6,422,082 B1 * | 7/2002 | Suh | G01N 29/0618 73/624 |
| 6,640,596 B2 * | 11/2003 | Yamamoto | G01L 5/14 72/53 |
| 7,028,378 B2 * | 4/2006 | Cheppe | B24B 1/04 29/889.21 |
| 9,200,341 B1 * | 12/2015 | Sanders | B24C 1/003 |
| 9,846,099 B1 | 12/2017 | Forgues et al. | |
| 10,330,564 B2 * | 6/2019 | Nervi | G06F 30/23 |
| 2002/0144529 A1 | 10/2002 | Yamamoto et al. | |

* cited by examiner

*Primary Examiner* — Max H Noori
(74) *Attorney, Agent, or Firm* — Botkin & Hall, LLP

(57) ABSTRACT

A shot peening intensity measurement device has a holder and a test disk formed from a resonant and hardened material. The test disk is held to the holder with a cover that threads onto the holder and clamps the test disk. The holder and test disk form a chamber where a portion of the test disk is unsupported. A measurement device, such as a microphone or other non-contacting device detects vibrations from the test disk when shot or media contacts the test disk.

12 Claims, 4 Drawing Sheets

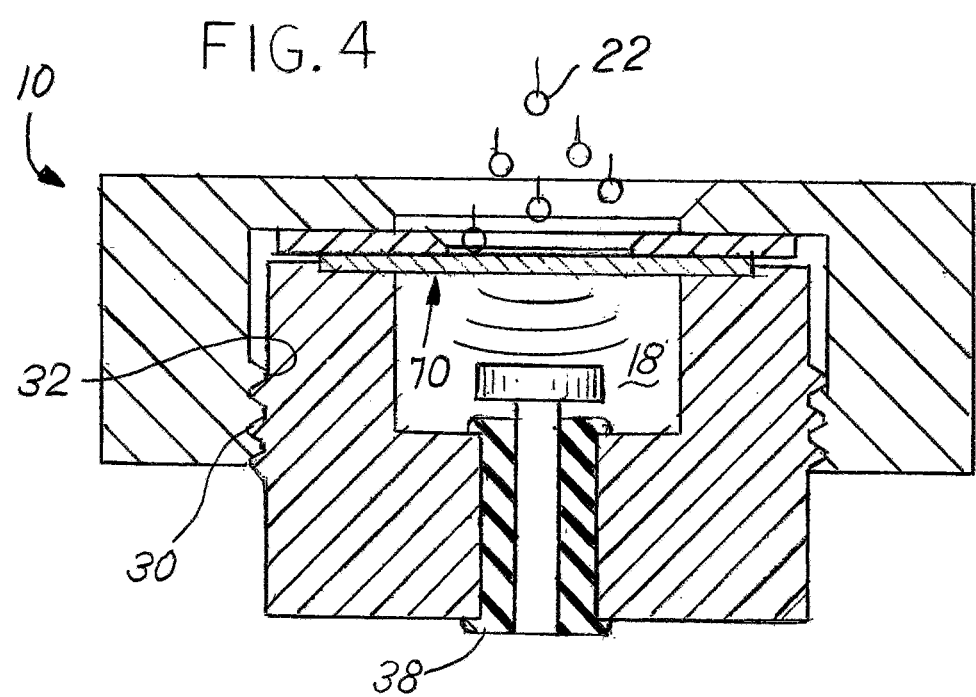

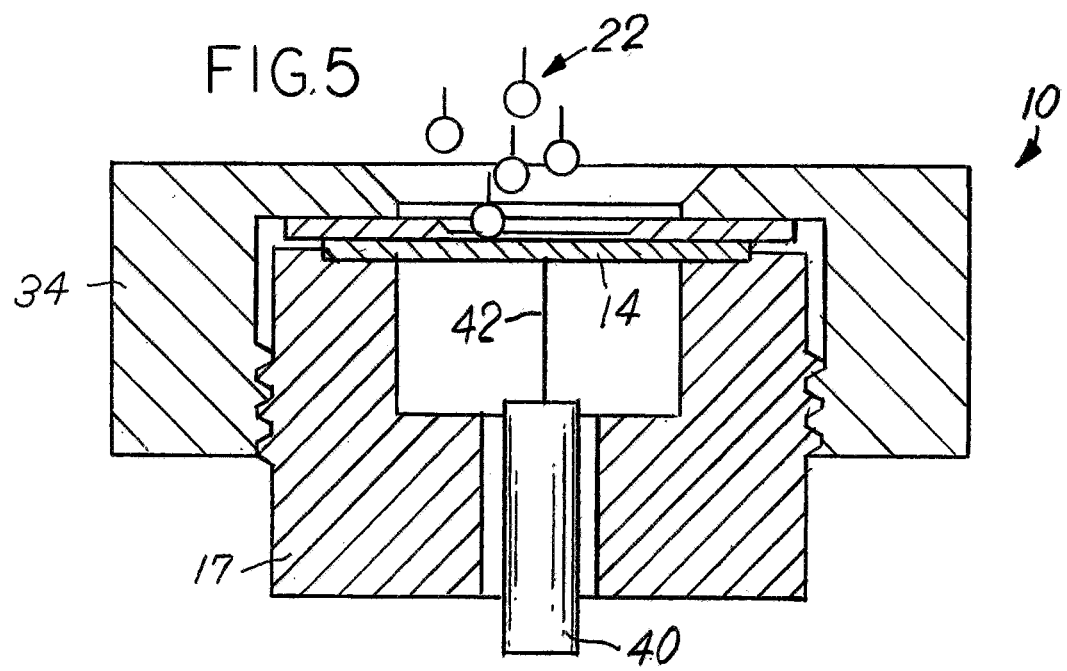
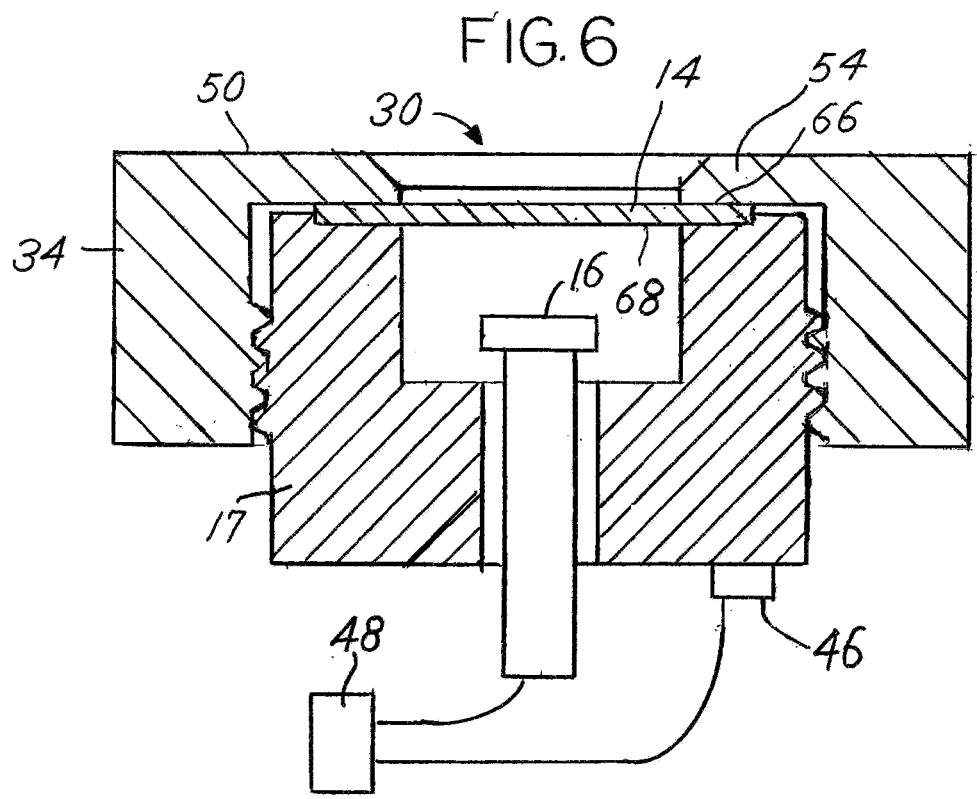

ELECTRONIC PEENING INTENSITY SENSOR

CROSS REFERENCE TO RELATED APPLICATIONS

This application claims the benefit of U.S. Provisional Application No. 62/669,136, filed May 9, 2018, the disclosures of which are hereby incorporated by reference.

BACKGROUND OF THE INVENTION

Peening or shot blasting metal parts is a common practice to treat the surface of metal to reduce internal stresses and reduce stress risers on a part. To produce repeatable results and provide an appropriate amount of peening, it is necessary to measure the intensity of the peening. The long standing standard practice for measuring shot peening intensity has been the use of an Almen strip. A traditional Almen strip is a narrow strip of steel as described in U.S. Pat. No. 2,350,440. The rectangular Almen strip is exposed to the peening process. Only one surface of the Almen strip is exposed to the peening process and that is the peened face. The opposite surface of the Almen strip is held so that it is not treated and remains unpeened; that is the unpeened surface. After an Almen strip is peened it will bow when it is removed from the fixture holding it throughout the peening process. The peened surface of the Almen strip becomes convex, and the unpeened surface is concave. The amount of curvature of the strip may be measured, and the amount of curvature corresponds to the intensity of the peening process to which the Almen strip was exposed. A variation of the Almen strip is a disk of metal that is exposed to shot peening. In the same manner as an Almen strip, the peened side of the disk becomes convex and the unpeened side of the disk is concave.

The problem with using Almen strips or equivalent is that it is a destructive test, requiring a new strip each time. For production facilities or when frequent measurement is required, the cost of replacement strips adds up. Therefore, there is a need for an accurate and re-useable measurement device to detect the intensity of the shot peening.

In an attempt to solve this problem, others have added transducers to measure shot peening intensity, but the transducers are affixed to the test component being impacted. Shot peening can use a variety of materials, including steel shot, stainless shot, glass bead, titanium, aluminum oxide, or garnet. Each of these types of materials may require different impacted test components to properly measure intensity. This makes exchanging of the component difficult, impossible, or expensive. Examples of these are shown in U.S. Pat. Nos. 4,470,292, 5,113,680, and 9,846,099. These all have measurement devices affixed to the component that receives the shot, making replacement or exchange of the test component difficult. An improved shot peening intensity measurement device is needed.

SUMMARY OF THE INVENTION

The present disclosure describes a re-usable shot peening intensity detection system that has an enclosed area with a diaphragm formed from a test disk that is secured to a holder with a screw-down cover that includes an aperture that exposes only a portion of the test disk. The measuring instrument, such as a microphone or laser Doppler vibrometer, is spaced from the test disk and picks up the vibrations of the test disk as shot impacts it. Because the measuring instrument is spaced from the test disk, the measuring instrument does not affect its resonance, mass, or other mechanical properties. Depending on the different blast media properties, different test disks may be required. For example, if larger shot is used, a thicker test disk may be necessary to withstand the impacts and properly resonate with each impact.

The test disk is held down by the cover to allow replacement or exchange of the test disk by unscrewing the cover. An optional washer with a reduced aperture may be implemented to obscure portions of the test disk, thereby limiting the amount of dispensed shot that contacts the disk. The washer and cover are relatively thick compared to the test disk. In the event that vibration from impacts of shot to the cover or washer is transferred and received by the measuring instrument, resilient absorbent materials may be implemented to isolate the instrument.

BRIEF DESCRIPTION OF THE DRAWINGS

A preferred embodiment of this invention has been chosen wherein:

FIG. 4 shows the operation of the sensor shown in FIG. 2 in use;

FIG. 5 is a section view of the sensor using a laser Doppler vibrometer; and

FIG. 6 is a section view of the sensor using a noise cancellation feedback device.

DESCRIPTION OF THE PREFERRED EMBODIMENT

Figure 1:
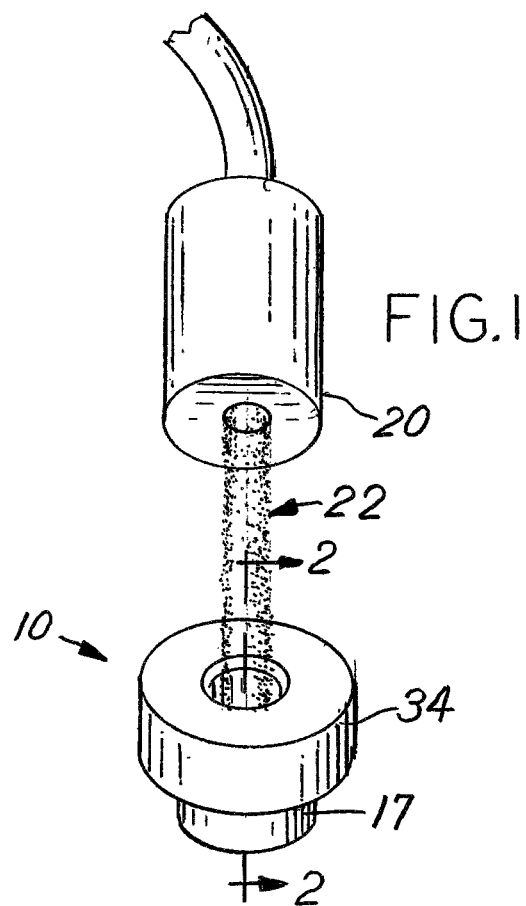
FIG. 1 is an isometric view of the sensor in use for detecting peening intensity.
Figure 2:
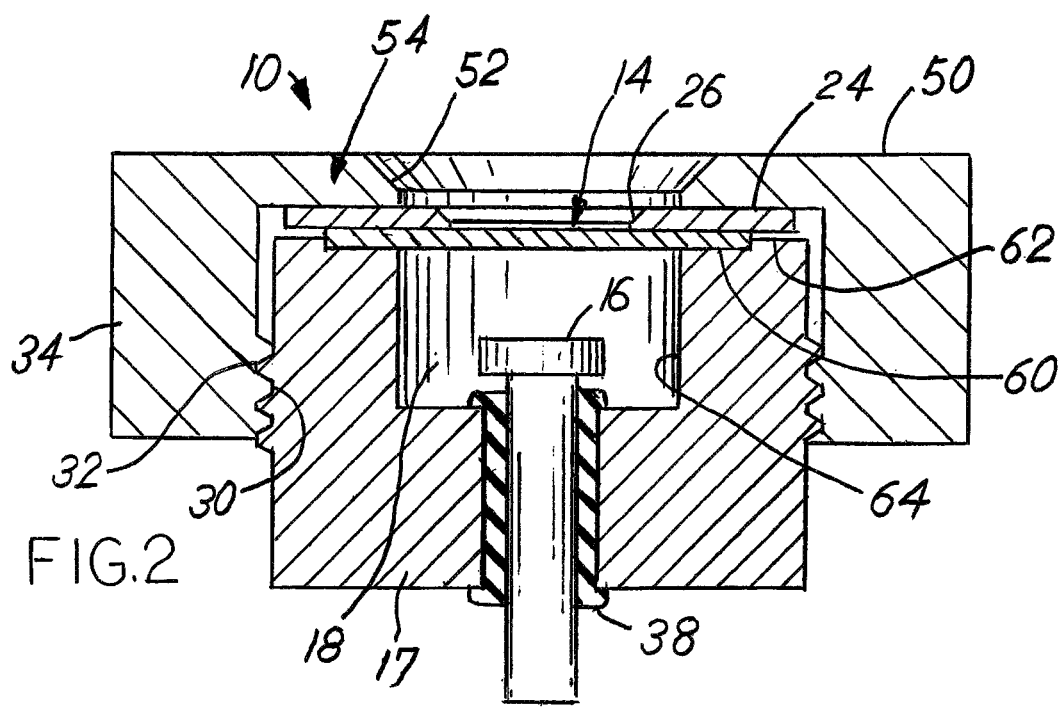
FIG. 2 is a section view 2-2 of the sensor in FIG. 1 using a microphone.
Figure 3:
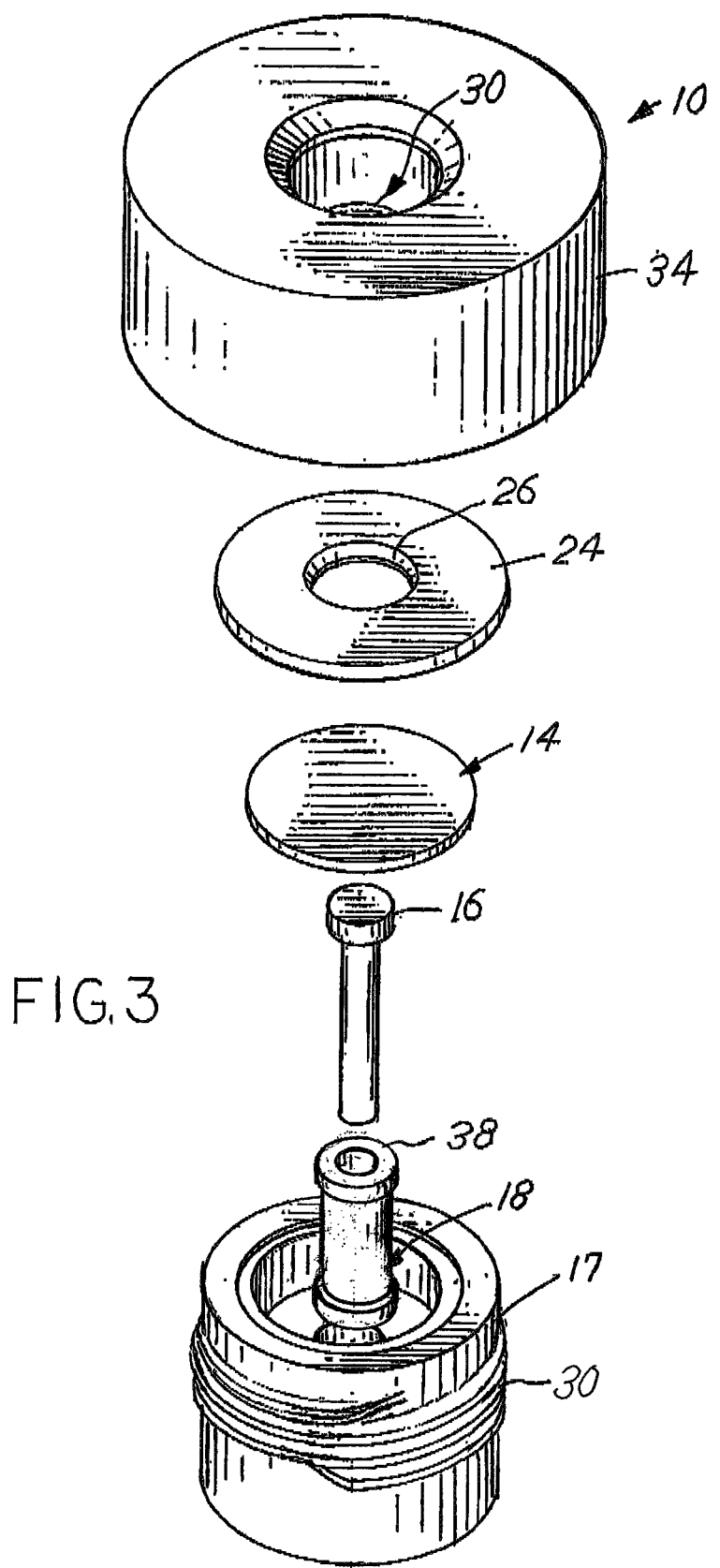
FIG. 3 is an exploded view of the sensor shown in FIG. 2.

A shot peening head 20 dispenses shot 22 for conditioning a surface or component (not shown). In order to determine the intensity of the dispensed shot 22, a peening sensor 10 can be placed in the stream of dispensed shot 22, as shown in FIG. 1. FIG. 2 shows a sectional view of the electronic peening sensor 10 of the present invention. The peening sensor 10 uses a test disk 14 that acts as an acoustic drum head when media impacts the test disk 14. Although the test disk 14 is shown as a round member for convenience of assembly, it is contemplated that other shapes could be used. The media or dispensed shot 22 impacting the test disk 14 produces sound waves that are received at a microphone 16. The microphone 16 is held in a holder 17 and the microphone 16 is located in a sensing chamber 18 within the holder 17. The microphone 16 produces a signal in response to sound it receives and that signal can be analyzed to determine peening intensity.

An optional washer 24 with an aperture 26 is held against the test disk 14 to secure it in place over the sensing chamber 18. The sensing chamber 18 is covered by the test disk 14 being held to the holder 17. The holder 17 has threads 30 for receiving a threaded mounting cover 34 that circumscribes the test disk 14. The mounting cover 34 compresses the washer 24 against the test disk 14 by threading onto the holder 17 with complimentary threads 32. In addition to being the hold-down means of the test disk 14, the mounting cover 34 and washer 24 could have various dimensions for the aperture 26, 52 (inside diameters) which could define the sensitive sensing area so that either more or fewer media impacts are registered. This could be useful at an extremely high media flow rate so the sensor 10 does not experience overload that would result in an inability to distinguish individual media impacts or overall strength.

The test disk 14, acting as an acoustic drum head or diaphragm, is fabricated from a suitable material that reacts to the impact of each media strike and generates a sound pressure wave into the sensing chamber 18. Depending on the type of dispensed shot, the test disk 14 may have different properties. For example, lightweight shot may require a thinner test disk, while heavier shot may require a thicker test disk. To prevent contamination of the media, the test disk 14 may be made from a compatible material to the shot. The test disk 14 has an outwardly facing surface 66 and inwardly facing surface 68 that define its thickness. Materials such as high hardness manganese steel or high impact resistant glass could be employed as the test disk 14. It is important that the test disk 14 (in particular the outwardly facing surface 66) not become affected or have modified properties after being impacted by the dispensed shot 22. If the material properties are changed, the vibrations produced by the test disk 14 will be changed, thereby creating repeatability issues with measuring dispensed shot 22. Detecting the impacts to the test disk 14 are desired since this will produce a sound pressure wave. Since media will also be impacting the mounting cover 34 and the washer 24, additional steps may have to be taken since these vibrations may be transferred to the microphone 16. Attachment of the test disk 14 with a resilient grommet (not shown) could be used to isolate it from vibrations of the holder 17. Additionally, the microphone 16 could be isolated from the holder 17 with a grommet 38 made from a dampening material.

Turning to the details of the mounting cover 34, the cover has a top surface 50 and a central aperture 52 that exposes the washer 24 and test disk 14. To prevent dispensed media 22 that hits the top surface 50 of the mounting cover 34 from getting detected, the mounting cover 34 has a thicker clamping portion 54 that directly aligns the central aperture 52 with the sensing chamber 18. It is contemplated that the mounting cover 43 may be made from a material less likely to transmit vibrations, such as a softer or filled material. It is further contemplated that the cover 34 is coated in a resilient or vibration absorbent material. As previously stated, the mounting cover 34 clamps the test disk 14. The test disk 14 is located in a disk pocket 60 which centers it over the sensing chamber 18. The disk pocket 60 is recessed from a top surface 62 of the holder 17. The test disk 14 is thicker than the depth of the disk pocket 60 in order to focus all of the clamping force generated by the mounting cover 34 on to the test disk 14. By focusing the clamping force, any relative movement or extraneous vibration is reduced or prevented altogether.

The test disk is unsupported over the sensing chamber 18 between the sidewall surfaces 64. This forms an unsupported area 70 where the disk 14 can move slightly with each impact. With the test disk 14 being thinner than any other component that receives impacts from dispensed shot 22, the test disk 14 resonates with each impact, like a drum head. The vibrations of the test disk 14 are transferred through the air in the sensing chamber 18 to the microphone 16. Due to the resonant nature of the test disk, each impact generates a distinctive pulse that is measured by the microphone 16 or other non-contacting sensing device. The greater the energy from the dispensed shot, the greater the amplitude of the test disk vibrations.

As shown in FIG. 5, a laser Doppler vibrometer 40 can be used instead of a microphone. Laser Doppler vibrometers are well-known in the art as capable of measuring movement of a surface by reflecting laser light 42 and measuring the frequency shift of the reflected light. This would be beneficial in an environment subject to considerable noise pollution, extraneous vibration, or any other environment where a microphone would not provide an accurate representative measurement of the peening impact energy. The vibrometer 40 uses the Doppler shift of reflected laser light 42 off of the test disk 14. As the dispensed shot 22 impacts the test disk 14, the vibrations are picked up by the reflected laser light 42 and converted into a signal. The frequency content and amplitude of that signal represent the intensity of the dispensed shot 22.

In an environment where undesirable noise and vibrations are unavoidably transferred to the holder 17, a feedback measurement of the holder vibrations can be used to cancel out undesirable noise. This method to reduce the influence of unwanted signals is to use a noise cancellation technique like is implemented in noise cancelling headphones. An accelerometer 46 could be attached to the holder 17, as shown in FIG. 6, and their output signals could then be subtracted from the microphone or vibrometer signals of the disk vibration with a cancellation circuit 48.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A shot peening sensor comprising:
   a holder having a bottom wall with a sidewall extending therefrom, said sidewall terminating at a top surface to form an open top, said top surface having a disk pocket surface recessed from said top surface, said sidewall having threads;
   a test disk having a thickness defined by a distance between an outwardly facing surface and an inwardly facing surface, said distance being greater than a depth of said disk pocket, said test disk and said holder forming a chamber, said test disk having an unsupported area resonating in response to impacts from shot to said outwardly facing surface;
   a mounting cover having complimentary threads mating with said threads on said sidewall to clamp said test disk to said holder and overlay said open top, said mounting cover having an aperture to expose a portion of said test disk; and
   a microphone spaced from said test disk and being held within said chamber, said microphone detecting said resonating of said test disk and generating a signal upon detecting said resonations.

2. The shot peening sensor of claim 1, wherein said microphone is held within an elastomeric isolation member within said holder.

3. The shot peening sensor of claim 1, further comprising an accelerometer affixed to said holder, said accelerometer having an output to subtract from said signal.

4. The shot peening sensor of claim 1, wherein said test disk is formed from a hardened resonant material.

5. The shot peening sensor of claim 4, wherein said test disk is formed from high hardness manganese steel.

6. The shot peening sensor of claim 4, wherein said test disk is formed from high impact resistant glass.

7. A shot peening sensor comprising:
a holder having a bottom wall with a sidewall extending therefrom, said sidewall terminating at a top surface to form an open top, said top surface having a disk pocket surface recessed from said top surface, said sidewall having threads;
a test disk having a thickness defined by a distance between an outwardly facing surface and an inwardly facing surface, said distance being greater than a depth of said disk pocket, said test disk and said holder forming a chamber, said test disk having an unsupported area resonating in response to impacts from shot to said outwardly facing surface;
a mounting cover having complimentary threads mating with said threads on said sidewall to clamp said test disk to said holder and overlay said open top, said mounting cover having an aperture to expose a portion of said test disk; and
a Doppler vibrometer spaced from said test disk and being held within said chamber, said vibrometer detecting said resonating of said test disk and generating a signal upon detecting said resonations.

8. The shot peening sensor of claim 7, wherein said vibrometer is held within an elastomeric isolation member within said holder.

9. The shot peening sensor of claim 7, further comprising an accelerometer affixed to said holder, said accelerometer having an output to subtract from said signal.

10. The shot peening sensor of claim 7, wherein said test disk is formed from a hardened resonant material.

11. The shot peening sensor of claim 10, wherein said test disk is formed from high hardness manganese steel.

12. The shot peening sensor of claim 10, wherein said test disk is formed from high impact resistant glass.

* * * * *